June 19, 1962 W. HAUSZ 3,040,310
RADAR TRACKING AND ANTENNA SYSTEMS
Filed July 23, 1951 4 Sheets-Sheet 1

Inventor:
Walter Hausz,
by Merton D Moore
His Attorney.

Inventor:
Walter Hausz,
by Merton D. Moore
His Attorney.

June 19, 1962  W. HAUSZ  3,040,310
RADAR TRACKING AND ANTENNA SYSTEMS
Filed July 23, 1951  4 Sheets-Sheet 3
Fig. 4A.
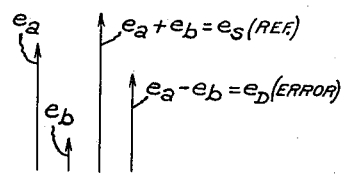
VOLTAGES FOR TARGET
IN AMPLITUDE-COMPARISON PLANE.
Fig. 4B.
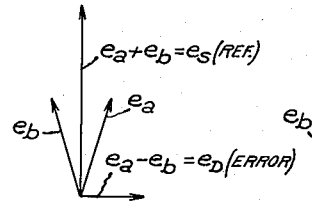
VOLTAGES FOR TARGET
IN PHASE-COMPARISON PLANE.
Fig. 4C.
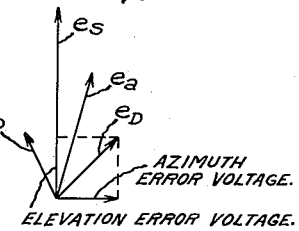
VOLTAGES
FOR RANDOM TARGET.
Fig. 5.
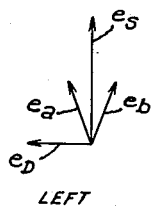
ABOVE AND LEFT.
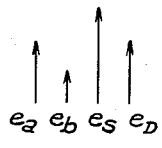
ABOVE
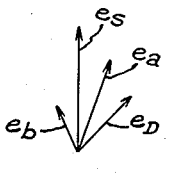
ABOVE AND RIGHT.
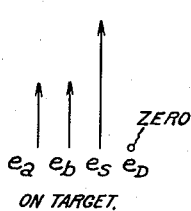
LEFT
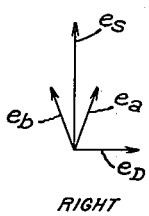
ON TARGET.
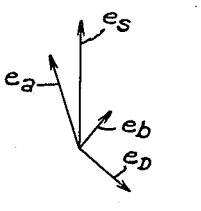
RIGHT
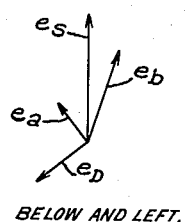
BELOW AND LEFT.
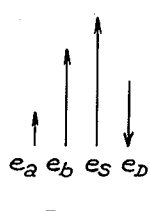
BELOW
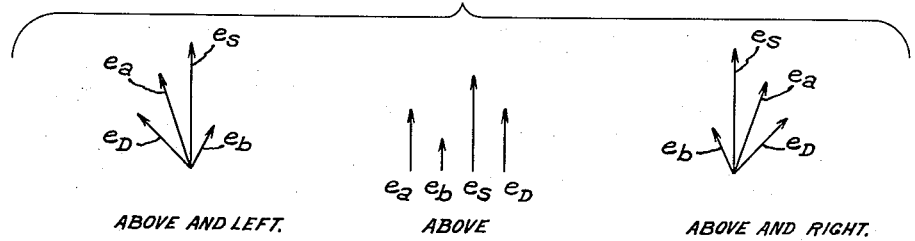
BELOW AND RIGHT.
Inventor:
Walter Hausz,
by Merlou D. Morss
His Attorney.

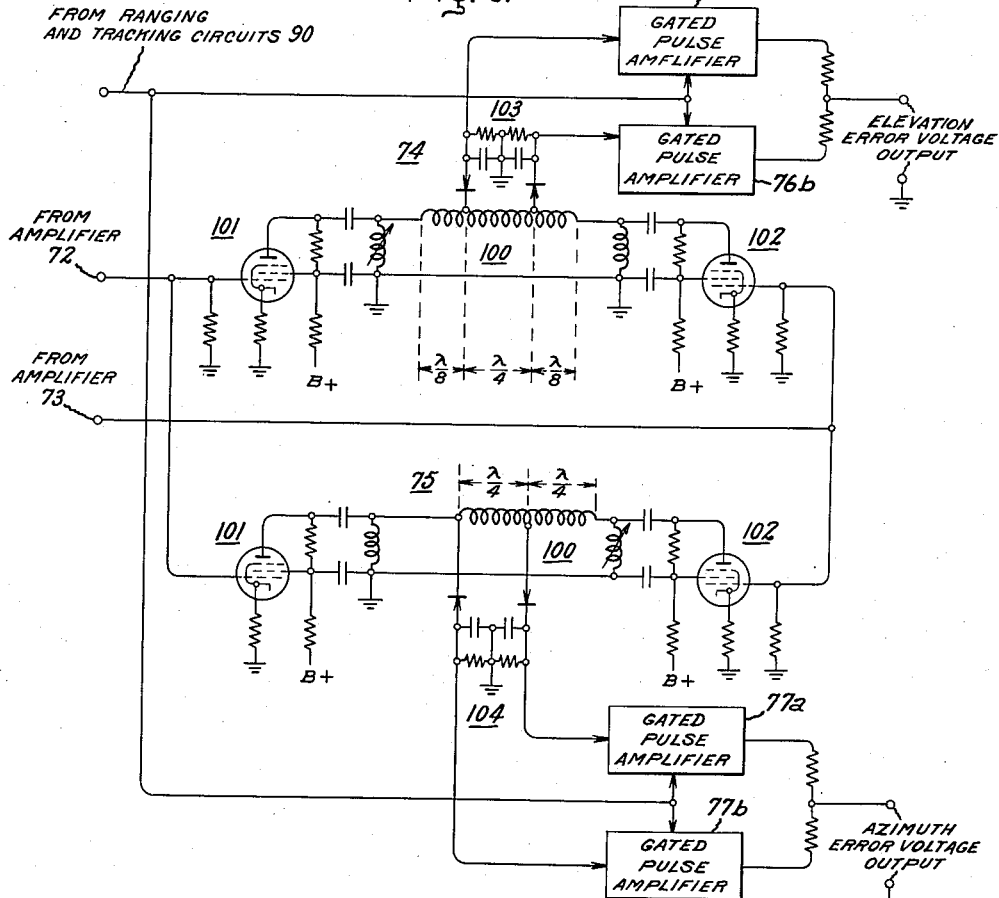
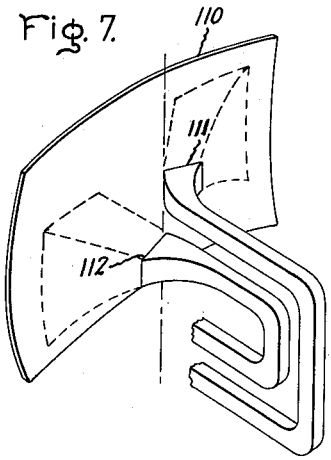
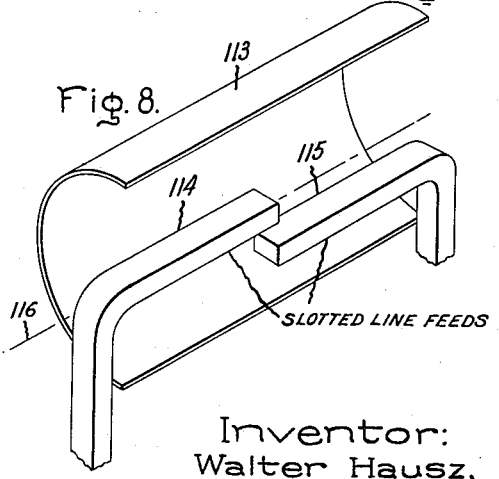
Inventor:
Walter Hausz,
by *Merton W. Moore*
His Attorney.

United States Patent Office 3,040,310
Patented June 19, 1962

3,040,310
RADAR TRACKING AND ANTENNA SYSTEMS
Walter Hausz, Syracuse, N.Y., assignor to General
Electric Company, a corporation of New York
Filed July 23, 1951, Ser. No. 238,071
40 Claims. (Cl. 343—7)

My invention relates to radar tracking systems, particularly systems of the monopulse type, for locating the position of a remote reflecting target. My invention also relates to an improved antenna array and feed system which is particularly applicable to systems of this type.

Radar position tracking systems may generally be divided into two classes, according to the manner in which the echo pulses, reflected from a remote object, are utilized to determine its angular coordinates. The first class to go into general use includes sequential types of systems in which a plurality of successive echo pulses are required to establish the target position. Lobe-switching and conical-scanning systems are included in this classification. In a well-known form of conical-scanning system, for example, the axis of directivity of a sharply-directive microwave antenna is caused to traverse a conical path as the radar pulses are transmitted and received. If the axis of the cone passes directly through a remote reflecting object, then no periodic change in the amplitude of successive echo pulses will be observed in the absence of fading. If the axis does not pass through the object, a cyclic variation in the amplitude of the reflected pulses occurs, which can be utilized to provide information as to the angular position of the object with respect to this axis. For further information on a system of this type, reference may be made to Patent 2,412,612 issued December 17, 1946, and to Patent 2,417,248, issued March 11, 1947, both of which were granted to Sidney Godet and assigned to the same assignee as the present invention.

Tracking systems of the sequential type, such as the conical-scanning system, have the advantage that all echo pulses may be passed through a common receiving, amplifying and detecting channel. However, they suffer from two serious limitations:

(1) They are affected by rapid fading variations in the amplitudes of the echoes, due to changes in the aspect of the target and atmospheric factors, requiring the integration of a considerable number of scans for satisfactory operation; and (2) They are quite vulnerable to jamming, for reasons well known to those skilled in the art.

The need for precision tracking of high-speed targets has led to the development of the second general class of position-tracking systems including the simultaneous, or monopulse, types in which each reflected echo pulse is simultaneously received and detected in a plurality of different channels, and utilized to provide complete information on target position and range. For example, one prior-art phase-comparison monopulse system utilizes two pairs of pulse receivers, each receiver having its own antenna. One pair of receivers is utilized to obtain azimuth information, and the other to obtain elevation information. The antennas of each pair are located so that their antenna patterns are parallel although they appear substantially coincident at some distance from the antennas because of their relatively close spacing, but with one pair spaced apart along a horizontal transverse axis and the other pair spaced apart along a vertical transverse axis. If the antennas of each pair are separated by more than one wavelength at the operating frequency, the difference in phase between the pulses received simultaneously at each pair of antennas can be utilized to provide the desired position information. A simple phase-comparison system of this type, adapted for locating one coordinate of a target, is more fully described, for example, in Patent 2,467,361 issued April 12, 1949, to John T. Blewett, and assigned to the same assignee as the present invention.

Another known form of simultaneous, or monopulse, system is the so-called amplitude-comparison system. This, again, utilizes two pairs of antennas and receivers, but has the antennas effectively located at a common point with their directive axes diverging from the common axis of the array. As is well-known to those skilled in the art, the coordinates of the target may then be determined from a comparison of the relative amplitudes of the echoes received by each pair of antennas.

In either type of monopulse system, the number of receiving antennas and receiver channels may readily be reduced from four to three, by utilizing one antenna and receiver which is common to both pairs, but even so, both types of monopulse systems have generally required three separate receiver channels, which greatly increases the complexity of the system as compared to systems of the sequential type. Unless each of the radio frequency amplifiers, and each of the intermediate frequency amplifiers, are very carefully designed and adjusted so as to have a high degree of phase-stability and uniform gain, appreciable tracking errors will be introduced.

In copending application Serial No. 238,112, filed July 23, 1951, by Oliver H. Winn and assigned to the same assignee as the present invention, improved monopulse systems are disclosed in which the number of separate receiver channels is further reduced to two. According to that invention, which is applicable both to amplitude-comparison systems and phase-comparison systems, means are provided for simultaneously amplifying both the azimuth and elevation error voltages in a single channel and then for effectively separating them out again after amplification. Very briefly, it is shown in the Winn application how two error voltages may be developed in response to the receipt of echo pulses from a target, one error voltage corresponding to the azimuth angle of the target with respect to the axis of the antenna array, and the other error voltage corresponding to the elevation angle of the target with respect to this axis. It is also shown that, since these error voltages are in phase with each other in either type of monopulse system, one of them may be shifted 90 degrees, and the two voltages may then be combined in order to provide a single resultant voltage which can be amplified in a single amplifying channel. A reference voltage is also developed. As is more fully described in the Winn application, it is then possible to detect the in-phase and quadrature-phase components of the amplified resultant voltage with respect to the reference voltage, and thereby to obtain output voltages respectively proportional to the original error voltage.

While the systems described and claimed in the aforesaid Winn application represent substantial improvements over prior art monopulse systems, particularly in regard to simplicity and accuracy, they still require four separate antennas and a relatively complex radio-frequency feed system incorporating three coupling devices, in order to develop the two error voltages and the reference voltage which are employed in the amplifying system.

In accordance with the present invention, I am able further to reduce the number of antennas to two and to greatly simplify the radio-frequency feed system, eliminating all but one of the coupling devices. Moreover, this is achieved without any sacrifice in the tracking precision of the apparatus. In fact, my improved system is easier to adjust for high precision in tracking. As will be described more fully in the following detailed specification, I accomplish these objectives by combining the techniques of amplitude-comparison and phase-comparison in such a way that two output radio-frequency pulse voltages are supplied from the antennas and feed system. One of these is a reference voltage, and the other is a composite error voltage whose in-phase and quadrature-phase components are inherently equal to the azimuth and elevation error voltages which are required to be amplified, detected and utilized for tracking and indicating purposes.

It is accordingly a primary object of my invention to provide an improved and simplified radar tracking and antenna system of the monopulse type.

Another object of my invention is to provide an improved radar tracking or locating system which is not only simpler in construction and adjustment than certain similar systems heretofore proposed, but which provides higher precision, greater stability and greater ease of adjustment.

Still another object of my invention is to provide an improved automatic radar tracking system of the monopulse type which is lighter, smaller and more compact than prior art systems.

Yet another object of my invention is to provide an improved and simplified monopulse radar tracking system for accurately determining the azimuth and elevation of a remote reflecting object.

A still further object of my invention is to provide an improved and simplified antenna array, having only two feeds, which is particularly suitable for use in a monopulse radar locating system.

For additional objects and advantages, and for a better understanding of my invention, attention is now directed to the following description and accompanying drawings. The features of my invention which are believed to be novel are particularly pointed out in the appended claims.

In the drawings:

FIGS. 4A–4C and 5 are vector diagrams illustrating certain voltage relationships which will be referred to in explaining the operation of my invention;

FIG. 6 is a detailed circuit diagram of a portion of the system of FIG. 1;

FIG. 7 is a perspective view of a modified form of antenna array embodying my invention, employing horn feeds; and FIG. 8 is a perspective view of still another modified form of antenna array embodying my invention and employing slotted line feeds.

Figure 1:
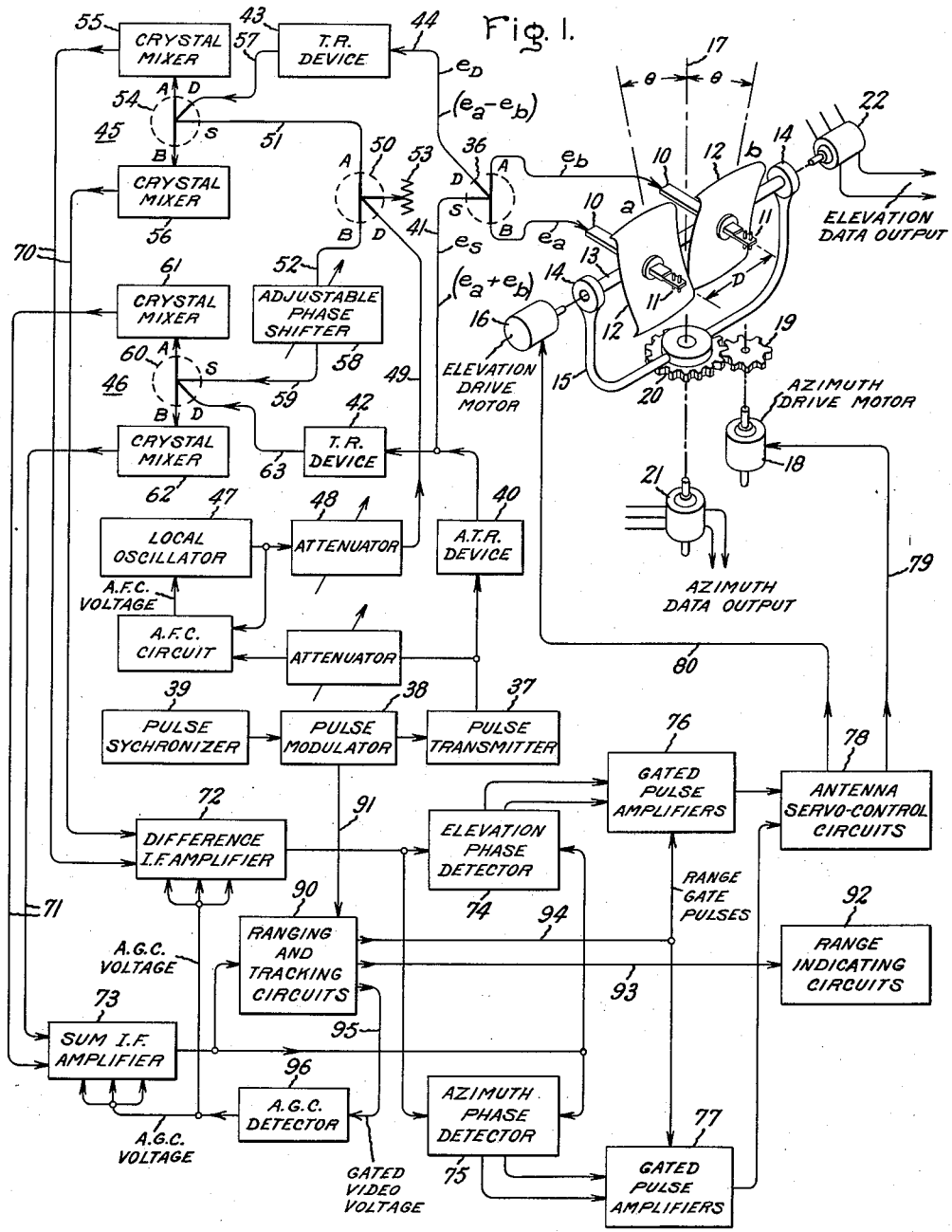
FIG. 1 is a simplified schematic block diagram of a complete monopulse tracking system, embodying the principles of my invention.

The tracking system of FIG. 1 comprises two directive microwave antenna units $a$ and $b$ which may be physically identical. In the particular form illustrated, each of them consists of a suitable wave guide 10 connected to a suitable radiating or receiving antenna assembly 11 which is located at or near the focus of a sectoral parabolic reflector 12. The antenna units are fixedly supported from a horizontal shaft 13 which is journaled in a pair of bearings 14 in a trunnion 15. The two antenna units may be tilted together in elevation by means of an elevation drive motor 16 suitably connected to shaft 13. This motor is preferably of the self-synchronous type, as is commonly employed in servo-systems.

The entire antenna array is also arranged to be rotated in azimuth about a vertical axis in any suitable manner, as by means of the azimuth drive motor 18 and pinion gears 19, 20. Motor 18 may also be of the self-synchronous type. The azimuth and elevation positions may also be conventionally transmitted to remote indicating points by means of selsyn data transmitters 21 and 22 which are respectively driven from the azimuth and elevation drive shafts.

It will be observed in FIG. 1 that the effective radiation centers of the two antenna units lie on a common horizontal axis and are separated by a distance D which is of the order of several wavelengths at the operating frequency of the system. It will also be observed that the beam axes of the two units are slightly tilted in the vertical plane with respect to each other, the reflector for antenna unit $a$ being tilted slightly upward from a common axis of symmetry 17 by an angle $\theta$ and the antenna unit $b$ being similarly tilted downward by this same angle with respect to the axis.

Figure 3A:
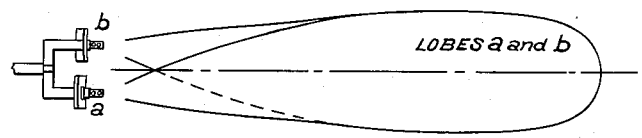
FIGS. 3A–3D are simplified sketches showing the antenna radiation patterns of the array embodying my invention.
Figures 3B, 3C:
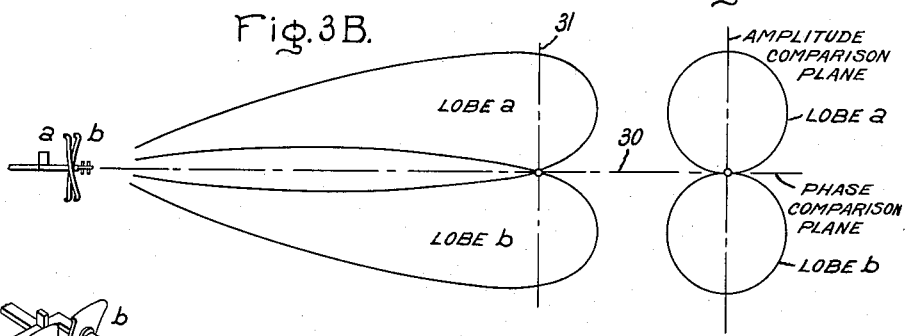

The major lobes of the antenna patterns thereby produced by this system are represented in FIGS. 3A–3D. Looking down on the system, as in FIG. 3A, the two major lobes are parallel and because of the relatively small spacing between units $a$ and $b$, appear substantially coincident. Viewed from the side, as in FIG. 3B, it will be seen that one lobe is tilted upward and the other downward from the common directive axis 30. If a horizontal plane is passed through the directive axis 30, the two lobes, or directive beam patterns, diverge from units $a$ and $b$ on opposite sides of said plane but do not diverge with respect to a vertical plane passing through axis 30. FIG. 3C illustrates generally the shapes of the antenna patterns in the transverse vertical plane 31 through the "cross-over" point of the two radiation patterns (which may conventionally be considered as representing the contours of the half-power points for circular pencil beams from the two units).

Figure 3D:
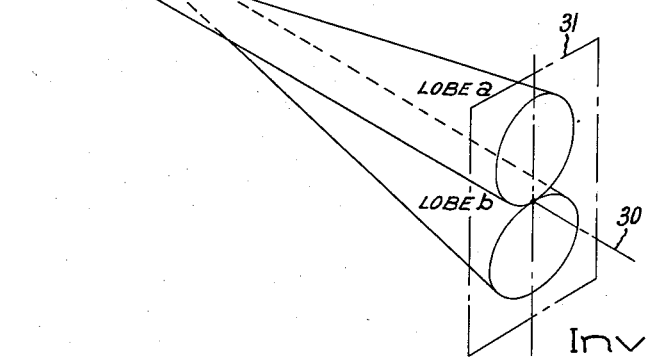

The relative positions of the two antenna beams are also more clearly indicated in the perspective view of FIG. 3D. The two beams are skewed with respect to each other so that their centers are spaced apart in the horizontal plane at the antenna array but are spaced apart vertically from each other for remote reflecting objects. It may readily be shown that the "skew angle" (that is, the angle between a transverse axis through the centers of the two beams and the horizontal) changes very rapidly with distance from the antenna array, and is substantially 90 degrees for all practical target distances exceeding a few yards from the array.

While the lobes $a$ and $b$ of the antenna patterns are represented as overlapping each other by a certain amount, it is to be understood that this is purely illustrative, and that they may be adjusted in practice to overlap by greater or lesser amounts, as required for best operation.

It will now be readily apparent to those skilled in the art that echoes received from a remote reflecting object in a vertical plane through the axis 30 of the array will be in phase at the two antenna units $a$ and $b$ but will have relative amplitudes of dependent upon the displacement of the object above or below the axis. This vertical plane can be termed an equi-phase signal reception plane or surface. That is, the error signal will be characteristic of that developed in a conventional amplitude-comparison monopulse system. Such a system is shown and described, for example, in the aforesaid copending Winn application. Therefore, the vertical plane through the system axis may be termed the "amplitude comparison plane."

For remote reflecting objects lying in the horizontal or mutually-transverse plane passing through the axis of the system, a phase-comparison type of error signal will result. That is, the amplitudes of the voltages produced by a single pulse echo at the two antenna units will be equal, due to the symmetry of the antenna patterns, but their phases will vary with the annular displacement of the object off the system axis, due to the substantial horizontal spacing between the centers of the antennas. This horizontal plane may be considered an equi-amplitude signal reception surface or plane which is orthogonally related with the vertical or equi-phase plane previously mentioned. This type of system is also more fully described in the aforesaid Winn application. The mutually-transverse plane through the antenna feeds and axis 30 may therefore be termed the "phase comparison" plane.

Referring again to the system of FIG. 1, the pulse echo voltages $e_a$ and $e_b$ from the two antenna units, resulting from the reflection of a single transmitted pulse from a remote target, are algebraically added and subtracted in order to provide a reference voltage $e_S$ and an error voltage $e_D$. As will be explained shortly, this error voltage has in-phase and quadrature-phase components with respect to the reference voltage which are respectively functions of the azimuth and elevation angles from the axis of the antenna array to the target.

Figure 2:
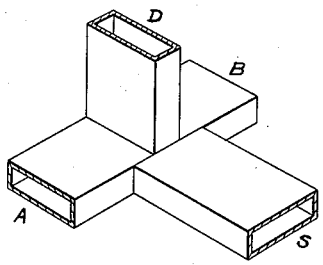
FIG. 2 is a perspective view of one of the "magic tee" couplers used in the radar system of FIG. 1.

The addition and subtraction of the two voltages $e_a$ and $e_b$ from the respective antenna units may conveniently be accomplished in a single wave-guide coupler 36, of the type commonly known to the art as a "magic tee." The physical construction of this coupler is shown in greater detail in FIG. 2, in which the four arms thereof have been correspondingly indicated by the same reference letters A, B, D and S as used in FIG. 1. For a detailed explanation of the construction and mode of operation of such a coupler, reference may be made to Patent 2,445,896 issued July 27, 1948, to Warren A. Tyrell. Very briefly, electromagnetic wave energy propagated into either the wave guide arm D or the arm S will be divided equally between the arms A and B, none of the energy being propagated into the other arm S and D. Conversely, if two waves of the same frequency are fed into the arms A and B respectively, their algebraic sum will appear in the arm S and their algebraic difference will appear in the arm D. This latter characteristic is utilized in the connection of the coupler 36 in FIG. 1. Of course, those skilled in the art will readily appreciate that other equivalent forms of coupling devices may optionally be employed, for example, the so-called "rat-race" type of coupler shown and described in Patent 2,445,895, also issued July 27, 1948, to Warren A. Tyrell.

Before proceeding further with the description of the remainder of the radar system of FIG. 1, it will be helpful to consider the vector relationships between the antenna voltages $e_a$ and $e_b$ and the resultant reference (sum) voltage $e_S$ and error (difference) voltage $e_D$. FIGS. 4A and 4B respectively illustrate the vector relationships of the voltages resulting from targets located off the antenna axis and in the amplitude-comparison and phase-comparison planes respectively. In the amplitude-comparison plane, the voltages $e_a$ and $e_b$ are in phase, but have unequal magnitudes depending upon the magnitude and direction of the displacement of the reflecting target off the antenna axis. The reference (sum) voltage $e_S$ and the error (difference) voltage $e_D$ are therefore likewise in phase with the antenna voltages.

In the phase-comparison plane, the antenna voltages $e_a$ and $e_b$ will always be of equal amplitudes, as shown in FIG. 4B, but their relative phase will depend upon the magnitude and direction of the displacement of the target object from the antenna axis. It will be observed that the reference voltage $e_S$ is still in the same phase direction as the reference voltage in FIG. 4A, but in this case the error voltage $e_D$ is in phase quadrature to it.

Thus, for any object lying in the amplitude-comparison plane the error voltage $e_D$ has only an in-phase component with respect to the reference voltage, while for any target lying in the phase-comparison plane the error voltage $e_D$ has only a quadrature component. It should be noted that by "in-phase component" is meant a component which has a phase angle with respect to the reference voltage which is an integral multiple of 180 electrical degrees (including zero degrees) at the component signal frequency. Thus, either positive and/or negative polarity signal components may be involved.

It will now be readily apparent that, for an object angularly displaced from both of the reference planes, the resultant error voltage $e_D$ is a vectorial combination of these two types of error voltages. Such a condition is illustrated in FIG. 4C for a particular target position selected at random. Here the antenna voltages $e_a$ and $e_b$ differ both in magnitude and phase. However, due to the symmetry of the array, the reference voltage $e_S$ still has the same phase direction as in FIGS. 4A and 4B. The resultant error voltage $e_D$, derived by subtracting the two antenna voltages has an intermediate phase and can be resolved into in-phase and quadrature-phase components which are respectively proportional to the angular elevation and azimuth of the target with respect to the two planes.

FIG. 5 shows similar vector diagrams of the voltages resulting from echoes from targets at different angular positions with respect to the antenna axis, as viewed from the antenna array. It will be observed that the resultant error voltage $e_D$ has a magnitude dependent upon the angular deviation of the target from the antenna axis and that it rotates in phase position, with respect to the reference voltage $e_S$, as the position of the target is rotated about the antenna axis. It becomes zero only for the condition where the target lies directly on the antenna axis. In all other cases it can be resolved into quadrature components proportional to the azimuth and elevation of the target object with respect to the electrical axis of the system.

It will thus be apparent that, through the use of a single pair of antennas and a single wave guide coupler, I have provided an error voltage and a reference voltage which may be separately amplified and then used to produce azimuth and elevation error voltages for control and indicating purposes. The remainder of the radar system of FIG. 1 may therefore be fundamentally the same as that shown and described in the aforesaid copending application, Serial No. 238,112, filed July 23, 1951, by Oliver H. Winn. The radiated pulse voltages, from which the echo voltages are derived, may, of course, be supplied from a separate transmitting antenna system. However, as shown in FIG. 1, it will generally be preferable to use the same antenna array for transmitting and receiving. Thus, the transmitting portion of the system may conventionally comprise a pulse transmitter 37 which is modulated by a pulse modulator 38. Modulator 38 is in turn caused to supply pulses to the transmitter under the control of a master pulse synchronizer 39. The high-power radio-frequency pulses from transmitter 37 are supplied in conventional manner through an anti-transmit-receive, or A.T.R. device 40 to a wave guide 41 which is connected to the sum, or S, arm of the "magic tee" coupler 36. From what has been said previously, in regard to the characteristics of this coupler, it will be apparent that the radio-frequency energy is divided between the two arms A and B so that the entire array operates as a single radiating unit.

Since the wave guide 41 is also coupled to delicate crystal detector elements of the radar receiver, it is necessary to protect them from the high-intensity transmitted pulses by means of a conventional transmit-receive, or T.R., device 42. The transmitted pulses are similarly prevented from reaching other sensitive crystal detector elements of the receiver by means of another T.R. device 43 connected to wave guide 44 which receives voltages from the difference, or D, arm of coupler 36.

The functions and operations of the devices 40, 42 and 43 are well-understood in the art and need not be repeated here. For further information, reference may be made to any modern text on radar equipment design, for example, Chapter XI of "Principles of Radar" by M.I.T. Radar School Staff (McGraw-Hill, 1946).

As is customary in radar systems, the R.F. pulse voltages which appear in the sum and difference channels 41 and 44, due to received echoes, are first heterodyned down to a convenient intermediate frequency before being further amplified and detected. As shown in FIG. 1, this is preferably accomplished by means of a pair of balanced crystal detector circuits 45 and 46, in which the incoming R.F. pulse voltages are heterodyned with R.F.

oscillations of the proper frequency, supplied from a common local oscillator 47. The local oscillator voltage is supplied through a suitable attenuator 48 and wave guide 49 to arm D of another "magic tee" coupler 50. The oscillator power is therefore divided equally between the arms A and B and supplied to the wave guides 51 and 52. Since the arm S is not utilized in this connection, it is merely terminated in a proper terminating load impedance, represented conventionally at 53.

Energy propagated into the wave guide 51 is supplied to the arm S of another "magic tee" coupler 54. The energy therefore divides between arms A and B which are respectively connected to crystal diode mixer elements 55 and 56 of a balanced detector circuit 45. Similarly, the R.F. pulse error voltage $e_D$, which passes through the T.R. device 43, is propagated through a wave guide section 57 into the arm D of the coupler 54. This energy, therefore, likewise, divides between the arms A and B of coupler 54.

The oscillator energy from the wave guide 52 is first passed through an adjustable phase shifter 58, and then through a wave guide section 59 to the arm S of another "magic tee" coupler 60. The coupler 60 is interconnected with a pair of crystal diode mixer elements 61 and 62 in another balanced detector circuit 46. Likewise, the R.F. pulse reference voltage $e_S$, which is supplied through the T.R. device 42, is impressed on the arm D of coupler 60 through a wave guide section 63.

As is well-known to those skilled in the art, the use of the balanced detector circuits 45 and 46 has certain practical advantages from the standpoint of reduction of noise components. However, it will, of course, be understood that single-ended detector circuits may optionally be employed.

The detected intermediate-frequency voltages appearing at the outputs of the balanced crystal detector circuits 45 and 46 have the same relative amplitudes and phase relationships as the input R.F. voltages, and are therefore also respectively proportional to $e_D$ and $e_S$. These voltages are supplied over the pairs of conductors 70 and 71 to a difference I.F. amplifier 72 and a sum I.F. amplifier 73, respectively.

The amplified error and reference voltages, at intermediate frequency, are now utilized to produce unidirectional error output voltages respectively proportional to the in-phase and quadrature-phase components of the error voltage. To accomplish this, the outputs of the two amplifiers 72 and 73 are impressed upon two phase detector circuits 74 and 75 in parallel. Detector circuit 74 is one which measures the magnitude of the in-phase components of the error voltage with respect to the reference voltage. From FIG. 4C, it will be recalled that this component corresponds to the elevation error, so this detector is the elevation phase detector. Detector circuit 75 measures the magnitude of the quadrature-phase component of the error voltage, and therefore constitutes the azimuth error phase detector. Various suitable types of detector circuits for this purpose are known to the art. One suitable type will be briefly described below in connection with the detailed circuit diagram of FIG. 6. For the moment, let it merely be assumed that each of the phase detector circuits is operative to develop detected pulse error voltages respectively proportional to the elevation and azimuth errors of the antenna system. These voltages are amplified in pulse amplifiers 76 and 77 and then utilized in any suitable servo-control circuits known to the art for readjusting the antenna array in azimuth and elevation in directions tending to reduce these error voltages to zero. This is indicated schematically in FIG. 1 by the connections to the antenna servo-control circuits 78 which have two outputs 79 and 80 connected to the azimuth drive motor 18 and to the elevation drive motor 16, respectively. For further details of suitable servo-control mechanisms and circuits, reference may be made, for example, to Chapter XII of the above-mentioned textbook, "Principles of Radar," or to Vol. 25 of the Radiation Laboratory Series entitled "Theory of Servomechanisms" by James, Nichols and Phillips (published by McGraw-Hill).

The range to the target object may be determined in known manner by comparing the time phase of the transmitted pulses with the time phase of the received echo pulses at the output of the sum channel amplifier 73. Thus, as shown in FIG. 1, the reference pulses from amplifier 73 are indicated as being supplied to ranging and tracking circuits 90 where they are compared with pulses supplied from the pulse modulator 38 over a connection 91. The details of design of such circuits are well known to those skilled in the art and form no part of the present invention. For further information on suitable ranging and tracking circuits, reference may be made to the copending application, Serial No. 543,235, filed July 3, 1944, by Robert L. Sink and assigned to the same assignee as the present invention. On January 1, 1952, the Sink application matured into Patent 2,581,211.

The ranging and tracking circuits 90 provide an output, over a connection 93, to any suitable range indicating circuits 92 known to the art. In order to provide a further reduction in the effects of extraneous noise in the system, the ranging and tracking circuits 90 are also preferably arranged to supply range gate pulses, over a second output connection 94, to the pulse amplifiers 76 and 77. As is well understood in the art, these amplifiers are thereby gated on, or caused to be operative, only during relatively narrow range gate intervals coinciding with the times of reception of echo pulses from a desired object to be located. Undesired reflections from other objects at different ranges are thereby prevented from affecting the error voltage outputs.

The ranging and tracking circuits 90 may also have a third output connection 95 supplying a gated video voltage which is utilized for automatic gain control of the amplifiers 72 and 73. Thus, this gated video voltage is indicated schematically in FIG. 1 as being supplied to an automatic gain control detector 96 which impresses A.G.C. potentials upon the several stages of these two amplifiers. These circuits may likewise be conventional. Suitable circuits for this portion of the system are shown, for example, in a copending application Serial No. 22,421, filed April 21, 1948, by Robert L. Sink, now Patent No. 2,743,355, and also assigned to the same assignee as the present invention.

For the elevation and azimuth phase detector circuits 74 and 75, I may employ phase detectors of the types more fully described and particularly claimed in a copending application, Serial No. 156,298, filed April 17, 1950, by Robert A. Zachary and John G. Schermerhorn, now Patent No. 2,734,168, which is also assigned to the same assignee as the present invention. For completeness of illustration, suitable forms of these circuits are shown in detail in FIG. 6. Very briefly, each detector comprises a half-wave transmission line section 100 which is terminated at one end in the plate circuit of an amplifier 101 and at the other end in the plate circuit of an amplifier 102. Each such circuit is properly adjusted to terminate the transmission line section 100 in its characteristic impedance. The amplifiers 101 are energized in parallel from the difference I.F. amplifier 72 and the amplifiers 102 are similarly energized in parallel from the sum I.F. amplifiers 73.

As is more fully explained in the aforesaid Zachary and Schermerhorn application, a standing voltage wave is thereby produced on each transmission line 100, having nodal points determined by the relative phase relation between the two input voltages. In order to measure the in-phase or quadrature-phase components of the input voltage from amplifier 72, with respect to the input voltage from amplifier 73, it is only necessary to detect the voltage appearing between two points on the transmission line which are electrically ¼ wavelength apart. As shown in FIG. 6, if it is desired to measure the in-phase component, a diode detector circuit 103 is connected to the transmission line 100 at quarter-wave points located symmetrically with respect to the ends thereof. In the quadrature-phase detector 75, the only difference is that a similar diode detector circuit 104 is connected to the transmission line 100 at the midpoint and at one end thereof.

In order further to minimize the effects of extraneous noise, the detected in-phase and quadrature-phase voltages are preferably amplified in balanced amplifier systems. Thus, as shown in FIG. 6, the gated pulse amplifiers are each represented as comprising pairs of amplifiers 76a, 76b and 77a, 77b. As previously mentioned, these amplifiers are gated by range gate voltages supplied from the ranging and tracking circuits 90 in well-known manner. The outputs of each pair of amplifiers are then added, as shown, to provide the resultant azimuth and elevation error voltage outputs, respectively.

In order to provide a precise "boresight" adjustment of the antenna system (that is, coincidence of the mechanical and electrical axes of the antenna system), mechanical adjustments (not shown) are provided on the antenna mount which permit data output devices 21 and 22 to be differentially displaced by small amounts with respect to shafts 20 and 13.

Another needed adjustment is provided by phase shifter 58 which is made adjustable, as previously mentioned. It may, for example, conventionally comprise a block of dielectric material which is inserted through a slot in one wall of the connecting wave guide, and which is adjustable in position. This permits the phase of the oscillator voltage to be adjusted at the two balanced detectors 45 and 46 to compensate for any differences in the total shifts undergone by the signals $e_D$ and $e_S$ between coupler 36 and phase detectors 74 and 75. When phase shifter 58 is adjusted so that both sum and difference channels have matched phase characteristics, then the in-phase component of error signal, as measured in detector circuit 74, will represent elevation error alone and will not contain a component of the azimuth error; and similarly detector circuit 75 will represent azimuth error alone. Application of these correction voltages to servo-control circuits 78 will cause the antenna to move only in azimuth to correct an azimuth error, and to move only in elevation to correct an elevation error. In other words, application of these voltages will cause the boresight axis to move in a straight line until it intersects the target. However, even if the phase characteristics of the two channels are not matched by proper adjustment of phase shifter 58, it will be found in practice that the antenna system will still be moved so as to cause the "boresight" axis to pass through the target, though it will approach the target in a spiral path in such case.

While I have illustrated in FIG. 1 a suitable antenna array comprising a pair of relatively-tilted dipole and reflector units, in which the reflector units are radiant acting in conjunction with the dipole units to provide the desired radiant action, i.e., radiation or reception, patterns, it will also be apparent to those skilled in the art that the desired type of radiation pattern may readily be achieved by other types of antenna systems. For example, there is shown in FIG. 7 an alternative antenna system comprising a single sectoral parabolic reflector 110 which has two portions individually illuminated by a pair of horn feeds 111 and 112. The horn feeds are respectively offset above and below the focus of the reflector 110 and oriented so that each illuminates roughly one-half of the reflector. It is thereby possible to obtain the same effective horizontal separation between the "phase centers" of the two antenna beams, and the same tilted relationship illustrated by the antenna patterns of FIGS. 3A–3D.

Another alternative form of antenna system is illustrated in the antenna system shown in perspective view in FIG. 8. This system employs a cylindrical reflector 113 with a pair of slotted line feeds 114 and 115. These feeds are respectively located above and below the focal axis 116 of the reflector and are arranged to illuminate equal left-hand and right-hand areas of reflector 113.

Instead of these types of antennas, it will also be apparent to those skilled in the art that antennas of the electron-lens type may be used.

It will thus be apparent that I have provided an improved and simplified radar tracking system, which combines the principles of amplitude-comparison and phase-comparison in a very desirable manner. This not only greatly simplifies the antenna array and its feed system, but reduces the number of amplifying channels for the error and reference signals to two. It has also been found in actual operation that my improved system permits tracking of relatively high-speed targets with a precision not heretofore obtainable with prior art monopulse tracking systems.

While certain specific embodiments of my invention have been shown and described, it will, of course, be understood that various other modifications may be made without departing from the principles of the invention. It is therefore to be understood that the appended claims are intended to cover any such modifications as fall within the true spirit and scope of the invention.

What I claim as new and desire to secure by Letters Patent of the United States is:

1. A high-frequency antenna array for a radar tracking system comprising a pair of antenna units spaced apart along a transverse axis lying in a first plane, each unit comprising an antenna feed and a reflector cooperatively arranged to produce a radiation pattern of generally pencil-beam shape, said units being oriented so that said beams diverge from said units on opposite sides of said plane and do not diverge with respect to a mutually-perpendicular plane bisecting said axis, means responsive to radar signals received by said units for providing a signal having first and second components which are in time quadrature with respect to each other, a common amplifying channel for amplifying said components, and means for utilizing said amplified components.

2. A high-frequency antenna array for a radar tracking system comprising a pair of antenna units spaced apart along a transverse axis lying in a first plane, each unit comprising an antenna feed and an individual reflector cooperatively arranged to produce a sharply-directive radiation pattern, said units being oriented so that said beams diverge symmetrically from said units on opposite sides of said plane and do not diverge with respect to a mutually perpendicular plane bisecting said axis, and means mounting said array for angular movement in both said planes, means responsive to radar signals received by said array for providing a pair of signals having a quadrature phase relationship with respect to each other, means for amplifying said pair of signals in a common amplifying channel, and means for separating said amplified signals into separate components.

3. A high-frequency antenna array for a radar tracking system comprising a focusing reflector, a pair of antenna feeds fixedly positioned with respect to said reflector near its focal point, said feeds being arranged to illuminate different areas lying on opposite sides of one of two mutually-perpendicular planes intersecting on the axis of symmetry of said reflector, thereby to produce two pencil-shaped radiation patterns, said feeds also being symmetrically offset from said axis so as to cause said radiation patterns to diverge from said feeds on opposite sides of said one plane and not to diverge with respect to the other of said planes, means responsive to radar signals received by said array according to said two patterns to provide a pair of signals having a quadrature phase relationship with respect to each other, means for amplifying said two signals in a common amplifying channel, phase sensitive means responsive to said amplified signals for separating said signals into separate components and means for utilizing said separate components.

4. A high-frequency antenna array for a radar tracking system comprising a reflector having a surface of revolution, a pair of antenna feeds fixedly positioned with respect to said reflector near its focal point, said feeds being arranged to illuminate different areas lying on opposite sides of one of two mutually-perpendicular planes intersecting on the axis of symmetry of said reflector, thereby to produce two pencil-shaped radiation patterns, said feeds also being symmerically offset from said axis so as to cause said radiation patterns to diverge from said feeds on opposite sides of said one plane and not to diverge with respect to the other of said planes, means mounting said array for angular movement in both said planes, means responsive to radar signals received by said array according to said two patterns to provide vector difference components thereof which are in phase quadrature with respect to each other, means for amplifying said difference components in a common amplifying channel, means for separating said amplified components in accordance with their phase quadrature relationship, and means for utilizing said separated amplified components.

5. In a radio locating system for determining the position of a remote object from which high frequency waves are radiated or reflected, a high-frequency antenna array comprising a pair of directive beam antenna units, said units having their effective beam origins spaced apart on a transverse axis lying in a first reference plane, said units being oriented to produce beams which diverge in opposite directions from said plane and which do not diverge with respect to a second reference plane perpendicularly intersecting said first plane, means for algebraically adding the waves received from said object at both said units to produce a reference voltage, and means for algebraically subtracting said received waves to produce an error voltage having in-phase and quadrature-phase components with respect to said reference voltage which are respectively functions of the angular deviation of said object from each of said two planes.

6. A combination amplitude-phase-comparison radar system for operation at a microwave frequency comprising a pair of directive antenna units constructed to have substantially symmetrical directive radiation patterns, said units having their effective electrical centers spaced apart by greater than one wavelength at said frequency and lying on a transverse axis in a phase-comparison plane, said units being oriented so that said patterns diverge symmetrically from said units on opposite sides of said plane and do not diverge with respect to a mutually-perpendicular amplitude-comparison plane bisecting said axis, means for algebraically combining wave energy received by said antennas, said combining means having a sum voltage output and a difference voltage output, and a pair of phase-detection circuits respectively energized from both said outputs, said circuits being constructed to produce error voltages respectively proportional to the inphase and quadrature-phase components of said difference voltage with respect to said sum voltage.

7. A combination amplitude-phase-comparison monopulse radar system for operation at a microwave frequency comprising a pair or directive antenna units constructed to have substantially symmetrical pencil-beam radiation patterns, said units having their effective electrical centers spaced apart by greater than one wavelength a said frequency and lying on a transverse axis in a phase-comparison plane, said units being oriented so that said patterns diverge symmetrically from said units on opposite sides of said plane and do not diverge with respect to a mutually-perpendicular amplitude comparison plane bisecting said axis, means for energizing said antennas conjointly to radiate pulses of wave energy at said frequency, means for algebraically combining wave energy received by said antennas in the intervals between said pulses, said combining means having a sum voltage output and a difference voltage output, a pair of amplifying channels respectively energized from said outputs, and a pair of phase-detection circuits energized from both said channels, said circuits being constructed to produce error voltages respectively proportional to the in-phase and quadrature-phase components of said difference voltage with respect to said sum voltage.

8. A radiant energy object-locating system comprising an antenna array for intercepting radiant energy waves from a remote object including a pair of directive beam antenna units, said units having their effective beam centers spaced apart on a transverse axis lying in a first reference plane, said units being oriented to produce beams which diverge in opposite directions from said first reference plane and which do not diverge with respect to a second reference plane perpendicularly intersecting said first reference plane, and said system further comprising means for combining the waves received from said object at both said units to derive a reference wave and another wave having in-phase and quadrature-phase components with respect to said reference wave which are functions of the angular deviation of said object from each of said first and second planes.

9. In combination, a pair of antenna elements effectively spaced from one another in a first reference plane, and at least one passive radiant acting element cooperating with said antenna elements to develop a pair of directive beams, said antenna and radiant acting elements being dimensioned and oriented relative to one another to cause said beams to diverge in opposite directions from said first reference plane and not diverge with respect to a second reference plane perpendicularly intersecting said first reference plane, means responsive to energy received by said pair of elements according to said pair of beams to provide a pair of vector difference components having a quadrature phase relationship with respect to each other, means for amplifying said components in a common amplifying channel, means for separating said amplified components in accordance with said quadrature phase relationship, and means for utilizing said separated components.

10. A high-frequency antenna array for a radar tracking system comprising a focusing reflector, a pair of horn type antenna feeds fixedly positioned with respect to said reflector near its focal point, said feeds being arranged to illuminate different areas lying on opposite sides of one of two mutually-perpendicular planes intersecting on the axis of symmetry of said reflector, thereby to produce two pencil-shaped radiation patterns, said feeds also being symmetrically offset from said axis so as to cause said radiation patterns to diverge from said array on opposite sides of said one plane and not to diverge with respect to the other of said planes, means responsive to energy received by said feeds according to said two patterns to provide a pair of vector difference components having a quadrature phase relationship with respect to each other, means for amplifying said components in a common amplifying channel, means for separating said amplified components in accordance with said quadrature phase relationship, and means for utilizing said separated components.

11. A high-frequency antenna array for a radar tracking system comprising a focusing reflector, a pair of slotted-line type antenna feeds fixedly positioned with respect to said reflector near its focal point, said feeds being arranged to illuminate different areas lying on opposite sides of one of two mutually-perpendicular planes intersecting on the axis of symmetry of said reflector, thereby to produce two pencil-shaped radiation patterns, said feeds also being symmetrically offset from said axis so as to cause said radiation patterns to diverge from said array on opposite sides of said one plane and not to diverge with respect to the other of said planes, means responsive to energy received by said feeds according to said two patterns to provide a pair of difference components having a quadrature phase relationship with respect to each other, means for amplifying said components in a common amplifying channel, means for separating said amplified components in accordance with said quadrature phase relationship, and means for utilizing said separated components.

12. In a radio locating system for determining the position of a remote object from which high frequency waves are radiated or reflected, a high-frequency antenna array comprising a pair of antenna units spaced apart along a transverse axis lying in a first plane, each unit comprising an antenna feed and a reflector cooperatively arranged to produce a radiation pattern of generally pencil-beam shape, said units being oriented so that said beams diverge symmetrically from said array on opposite sides of said plane and not to diverge with respect to a mutually-perpendicular plane bisecting said axis, means for algebraically adding the waves received from said object at both said units to produce a reference voltage, and means for algebraically subtracting said received waves to produce an error voltage having in-phase and quadrature-phase components with respect to said reference voltage which are respectively functions of the angular deviation of said object from each of said two planes.

13. In a radio locating system for determining the position of a remote object from which high frequency waves are radiated or reflected, a high-frequency antenna array comprising a pair of antenna units spaced apart along a transverse axis lying in a first plane, each unit comprising an antenna feed and an individual reflector cooperatively arranged to produce a sharply-directive radiation pattern, said units being oriented so that said beams diverge symmetrically from said array on opposite sides of said plane and do not diverge with respect to a mutually perpendicular plane bisecting said axis, and means mounting said array for angular movement in both said planes, means for algebraically adding the waves received from said object at both said units to produce a reference voltage, and means for algebraically subtracting said received waves to produce an error voltage having in-phase and quadrature-phase components with respect to said reference voltage which are respectively functions of the angular deviation of said object from each of said two planes.

14. In a radio locating system for determining the position of a remote object from which high frequency waves are radiated or reflected, a high-frequency antenna array comprising a focusing reflector, a pair of antenna feeds fixedly positioned with respect to said reflector near its focal point, said feeds being arranged to illuminate different areas lying on opposite sides of one of two mutually-perpendicular planes intersecting on the axis of symmetry of said reflector, thereby to produce two pencil-shaped radiation patterns, said feeds also being symmetrically offset from said axis so as to cause said radiation patterns to diverge from said array on opposite sides of said one plane and not to diverge with respect to the other of said planes, means for algebraically adding the waves received from said object at both said units to produce a reference voltage, and means for algebraically subtracting said received waves to produce an error voltage having in-phase and quadrature-phase components with respect to said reference voltage which are respectively functions of the angular deviation of said object from each of said two planes.

15. In a radio locating system for determining the position of a remote object from which high frequency waves are radiated or reflected, a high-frequency antenna array comprising a reflector having a surface of revolution, a pair of antenna feeds fixedly positioned with respect to said reflector near its focal point, said feeds being arranged to illuminate different areas lying on opposite sides of one of two mutually-perpendicular planes intersecting on the axis of symmetry of said reflector, thereby to produce two pencil-shaped radiation patterns, said feeds also being symmetrically offset from said axis so as to cause said radiation patterns to diverge from said array on opposite sides of said one plane and not to diverge with respect to the other of said planes, and means mounting said array for angular movement in both said planes, means for algebraically adding the waves received from said object at both said units to produce a reference voltage, and means for algebraically subtracting said received waves to produce an error voltage having in-phase and quadrature-phase components with respect to said reference voltage which are respectively functions of the angular deviation of said object from each of said two planes.

16. In a radio locating system for determining the position of a remote object from which high frequency waves are radiated or reflected, a high-frequency antenna array comprising a pair of antenna elements effectively spaced from one another in a first reference plane, and at least one parasitic element cooperating with said antenna elements to develop a pair of directive beams which diverge in opposite directions from said first reference plane and which do not diverge with respect to a second reference plane perpendicularly intersecting said first reference plane, means for algebraically adding the waves received from said object at both said units to produce a reference voltage, and means for algebraically subtracting said received waves to produce an error voltage having in-phase and quadrature-phase components with respect to said reference voltage which are respectively functions of the angular deviation of said object from each of said first and second planes.

17. A combination amplitude-phase-comparison radar system for operation at a microwave frequency comprising a pair of antenna units spaced apart along a transverse axis lying in a first plane, each unit comprising an antenna feed and a reflector cooperatively arranged to produce a radiation pattern of generally pencil-beam shape, said units being oriented so that said beams diverge symmetrically on opposite sides of said plane and not to diverge with respect to a mutually-perpendicular plane bisecting said axis, means for algebraically combining wave energy received by said antennas, said combining means having a sum voltage output and a difference voltage output, and a pair of phase-detection circuits respectively energized from both said outputs, said circuits being constructed to produce error voltages respectively proportional to the in-phase and quadrature-phase components of said difference voltage with respect to said sum voltage.

18. A combination amplitude-phase-comparison radar system for operation at a microwave frequency comprising a pair of antenna units spaced apart along a transverse axis lying in a first plane, each unit comprising an antenna feed and an individual reflector cooperatively arranged to produce a sharply-directive radiation pattern, said units being oriented so that said beams diverge symmetrically on opposite sides of said plane and not to diverge with respect to a mutually-perpendicular plane bisecting said axis, and means mounting said array for angular movement in both said planes, means for algebraically combining wave energy received by said antennas, said combining means having a sum voltage output and a difference voltage output, and a pair of phase-detection circuits respectively energized from both said outputs, said circuits being constructed to produce error voltages respectively proportional to the in-phase and quadrature-phase components of said difference voltage with respect to said sum voltage.

19. A combination amplitude-phase-comparison radar system for operation at a microwave frequency comprising a focusing reflector, a pair of antenna feeds fixedly positioned with respect to said reflector near its focal point, said feeds being arranged to illuminate different areas lying on opposite sides of one of two mutually-perpendicular planes intersecting on the axis of symmetry of said reflector, thereby to produce two pencil-shaped radiation patterns, said feeds also being symmetrically offset from said axis so as to cause said radiation patterns to diverge from said reflector on opposite sides of said one plane and not to diverge with respect to the other of said planes, means for algebraically combining wave energy received by said antennas, said combining means having a sum voltage output and a difference voltage output, and a pair of phase-detection circuits respectively energized from both said outputs, said circuits being constructed to produce error voltages respectively proportional to the in-phase and quadrature-phase components of said difference voltage with respect to said sum voltage.

20. A combination amplitude-phase-comparison radar system for operation at a microwave frequency comprising a reflector having a surface of revolution, a pair of antenna feeds fixedly positioned with respect to said reflector near its focal point, said feeds being arranged to illuminate different areas lying on opposite sides of one of two mutually-perpendicular planes intersecting on the axis of symmetry of said reflector, thereby to produce two pencil-shaped radiation patterns, said feeds also being symmetrically offset from said axis so as to cause said radiation patterns to diverge from said reflector on opposite sides of said one plane and not to diverge with respect to the other of said planes, and means mounting said array for angular movement in both said planes, means for algebraically combining wave energy received by said antennas, said combining means having a sum voltage output and a difference voltage output, and a pair of phase-detection circuits respectively energized from both said outputs, said circuits being constructed to produce error voltages respectively proportional to the in-phase and quadrature-phase components of said difference voltage with respect to said sum voltage.

21. A combination amplitude-phase-comparison radar system for operation at a microwave frequency comprising a pair of antenna elements effectively spaced from one another in a first reference plane, and at least one parasitic element cooperating with said antenna elements to develop a pair of directive beams which diverge in opposite directions from said first reference plane and which do not diverge from a second reference plane perpendicularly intersecting said first reference plane, means for algebraically combining wave energy received by said antennas, said combining means having a sum voltage output and a difference voltage output, and a pair of phase-detection circuits respectively energized from both said outputs, said circuits being constructed to produce error voltages respectively proportional to the in-phase and quadrature-phase components of said difference voltage with respect to said sum voltage.

22. A combination amplitude-phase-comparison mono-pulse radar system for operation at a microwave frequency comprising a pair of antenna units spaced apart along a transverse axis lying in a first plane, each unit comprising an antenna feed and a reflector cooperatively arranged to produce a radiation pattern of generally pencil-beam shape, said units being oriented so that said beams diverge symmetrically on opposite sides of said plane and not to diverge with respect to a mutually-perpendicular plane bisecting said axis, means for energizing said antennas conjointly to radiate pulses of wave energy at said frequency, means for algebraically combining wave energy received by said antennas in the intervals between said pulses, said combining means having a sum voltage output and a difference voltage output, a pair of amplifying channels respectively energized from said outputs, and a pair of phase-detection circuits energized from both said channels, said circuits being constructed to produce error voltages respectively proportional to the in-phase and quadrature-phase components of said difference voltage with respect to said sum voltage.

23. A combination amplitude-phase-comparison mono-pulse radar system for operation at a microwave frequency comprising a pair of antenna units spaced apart along a transverse axis lying in a first plane, each unit comprising an antenna feed and an individual reflector cooperatively arranged to produce a sharply-directive radiation pattern, said units being oriented so that said beams diverge symmetrically on opposite sides of said plane and not to diverge with respect to a mutually-perpendicular plane bisecting said axis, and means mounting said array for angular movement in both said planes, means for energizing said antennas conjointly to radiate pulses of wave energy at said frequency, means for algebraically combining wave energy received by said antennas in the intervals between said pulses, said combining means having a sum voltage output and a difference voltage output, a pair of amplifying channels respectively energized from said outputs, and a pair of phase-detection circuits energized from both said channels, said circuits being constructed to produce error voltages respectively proportional to the in-phase and quadrature-phase components of said difference voltage with respect to said sum voltage.

24. A combination amplitude-phase-comparison mono-pulse radar system for operation at a microwave frequency comprising a focusing reflector, a pair of antenna feeds fixedly positioned with respect to said reflector near its focal point, said feeds being arranged to illuminate different areas lying on opposite sides of one of two mutually-perpendicular planes intersecting on the axis of symmetry of said reflector, thereby to produce two pencil-shaped radiation patterns, said feeds also being symmetrically offset from said axis so as to cause said radiation patterns to diverge on opposite sides of said one plane and not to diverge with respect to the other of said planes, means for energizing said antennas conjointly to radiate pulses of wave energy at said frequency, means for algebraically combining wave energy received by said antennas in the intervals between said pulses, said combining means having a sum voltage output and a difference voltage output, a pair of amplifying channels respectively energized from said outputs, and a pair of phase-detection circuits energized from both said channels, said circuits being constructed to produce error voltages respectively proportional to the in-phase and quadrature-phase components of said difference voltage with respect to said sum voltage.

25. A combination amplitude-phase-comparison mono-pulse radar system for operation at a microwave frequency comprising a reflector having a surface of revolution, a pair of antenna feeds fixedly positioned with respect to said reflector near its focal point, said feeds being arranged to illuminate different areas lying on opposite sides of one of two mutually-perpendicular planes intersecting on the axis of symmetry of said reflector, thereby to produce two pencil-shaped radiation patterns, said feeds also being symmetrically offset from said axis so as to cause said radiation patterns to diverge on opposite sides of said one plane and not to diverge with respect to the other of said planes, and means mounting said array for angular movement in both said planes, means for energizing said antennas conjointly to radiate pulses of wave energy at said frequency, means for algebraically combining wave energy received by said antennas in the intervals between said pulses, said combining means having a sum voltage output and a difference voltage output, a pair of amplifying channels respectively energized from said outputs, and a pair of phase-detection circuits energized from both said channels, said circuits being constructed to produce error voltages respectively proportional to the in-phase and quadrature-phase components of said difference voltage with respect to said sum voltage.

26. A combination amplitude-phase-comparison mono-pulse radar system for operation at a microwave frequency comprising a pair of antenna elements effectively spaced from one another in a first reference plane, and at least one parasitic element cooperating with said antenna elements to develop a pair of directive beams which diverge in opposite directions from said first reference plane and which do not diverge from a second reference plane perpendicularly intersecting said first reference plane, means for energizing said antennas conjointly to radiate pulses of wave energy at said frequency, means for algebraically combining wave energy received by said antennas in the intervals between said pulses, said combining means having a sum voltage output and a difference voltage output, a pair of amplifying channels respectively energized from said outputs, and a pair of phase-detection circuits energized from both said channels, said circuits being constructed to produce error voltages respectively proportional to the in-phase and quadrature-phase components of said difference voltage with respect to said sum voltage.

27. A radiant energy object-locating system comprising an antenna array for intercepting radiant energy waves from a remote object including a pair of antenna units spaced apart along a transverse axis lying in a first plane, each unit comprising an antenna feed and a reflector cooperatively arranged to produce a radiation pattern of generally pencil-beam shape, said units being oriented so that said beams diverge symmetrically on opposite sides of said first plane and not to diverge with respect to a second, mutually-perpendicular plane bisecting said axis, and said system further comprising means for combining the waves received from said object at both said units to derive a reference wave and another wave having in-phase and quadrature-phase components with respect to said reference wave which are functions of the angular deviation of said object from each of said first and second planes.

28. A radiant energy object-locating system comprising an antenna array for intercepting radiant energy waves from a remote object including a pair of antenna units spaced apart along a transverse axis lying in a first plane, each unit comprising an antenna feed and an individual reflector cooperatively arranged to produce a sharply-directive radiation pattern, said units being oriented so that said beams diverge symmetrically on opposite sides of said first plane and not to diverge with respect to a second, mutually-perpendicular plane bisecting said axis, and means mounting said array for angular movement in both said planes, and said system further comprising means for combining the waves received from said object at both said units to derive a reference wave and another wave having in-phase and quadrature-phase components with respect to said reference wave which are functions of the angular deviation of said object from each of said first and second planes.

29. A radiant energy object-locating system comprising an antenna array for intercepting radiant energy waves from a remote object including a focusing reflector, a pair of antenna feeds fixedly positioned with respect to said reflector near its focal point, said feeds being arranged to illuminate different areas lying on opposite sides of one of two mutually-perpendicular planes intersecting on the axis of symmetry of said reflector, thereby to produce two pencil-shaped radiation patterns, said feeds also being symmetrically offset from said axis so as to cause said radiation patterns to diverge on opposite sides of said one plane and not to diverge with respect to the other of said planes, and said system further comprising means for combining the waves received from said object at both said units to derive a reference wave and another wave having in-phase and quadrature-phase components with respect to said reference wave which are functions of the angular deviation of said object from each of said planes.

30. A radiant energy object-locating system comprising an antenna array for intercepting radiant energy waves from a remote object including a reflector having a surface of revolution, a pair of antenna feeds fixedly positioned with respect to said reflector near its focal point, said feeds being arranged to illuminate different areas lying on opposite sides of one of two mutually-perpendicular planes intersecting on the axis of symmetry of said reflector, thereby to produce two pencil-shaped radiation patterns, said feds also being symmetrically offset from said axis so as to cause said radiation patterns to diverge on opposite sides of said one plane and not to diverge with respect to the other of said planes, and means mounting said array for angular movement in both said planes, and said system further comprising means for combining the waves received from said object at both said units to derive a reference wave and another wave having in-phase and quadrature-phase components with respect to said reference wave which are functions of the angular deviation of said object from each of said planes.

31. A radiant energy object-locating system comprising an antenna array for intercepting radiant energy waves from a remote object including a pair of antenna elements effectively spaced from one another in a first reference plane, and at least one parasitic element cooperating with said antenna elements to develop a pair of directive beams which diverge in opposite directions from said first reference plane and which do not diverge from a second reference plane perpendicularly intersecting said first reference plane, and said system further comprising means for combining the waves received from said object at both said units to derive a reference wave and another wave having in-phase and quadrature-phase components with respect to said reference wave which are functions of the angular deviation of said object from each of said first and second planes.

32. A receiving antenna arrangement comprising a plurality of receptors, means for effectively spacing said receptors to provide an electromagnetic wave reception pattern having an equi-phase signal reception plane, means for effectively diverging said receptors to cause said pattern to also have an equi-amplitude signal reception plane, said effective spacing and divergence dimensioned to provide said first equi-phase plane at right angles to said equi-amplitude plane, means responsive to waves received by said receptors according to said pattern to provide a pair of signal components having a quadrature phase relationship with respect to each other, one of said components representing the angle of arrival of said waves with respect to said equi-phase plane and the other component representing the angle of arrival of said waves with respect to said equi-amplitude plane, means for amplifying said components in a common amplifying channel, means for separating said amplified components in accordance with said quadrature phase relationship, and means for utilizing said separated components.

33. An energy signal receiving arrangement comprising a pair of receptors, means for effectively spacing said receptors to provide an energy signal reception pattern having an equi-phase signal reception surface, means for effectively diverging said receptors to cause said pattern to have also an equi-amplitude signal reception surface, said effective spacing and divergence dimensioned to provide said equi-phase surface at right angles to said equi-amplitude surface, means responsive to energy signals received by said receptors according to said pattern to provide a pair of signal components having a quadrature phase relationship with respect to each other, one of said components representing the angle of arrival of said energy signals with respect to said equi-phase surface and the other component representing the angle of arrival of said energy signals with respect to said equi-amplitude surface, means for amplifying said components in a common amplifying channel, means for separating said amplified components in accordance with said quadrature phase relationship, and means for utilizing said separated components.

34. A radiant acting arrangement comprising a plurality of radiant acting elements, means for effectively spacing said elements to provide an energy signal radiant action pattern having an equi-phase signal surface, means for effectively diverging said receptors to cause said pattern to have also an equi-amplitude signal surface, said effective spacing and divergence dimensioned to provide said first equi-phase surface at right angles to said equi-amplitude surface, means responsive to energy signals received by said elements according to said pattern to provide a pair of signal components in phase quadrature relationship with respect to each other, one of said components representing the angle of arrival of said energy signals with respect to said equi-phase surface and the other component representing the angle of arrival of said energy signals with respect to said equi-amplitude surface, means for amplifying said components in a common amplifying channel, means for separating said amplified components in accordance with their quadrature phase relationship, and means for utilizing said separated components.

35. An arrangement for determining uniquely the two coordinate direction of arrival of a received signal comprising two directive signal receptors for receiving said signal, means for effectively spacing and diverging said receptors relative to one another to enable detection of two independent characteristics of said received signal related to its two coordinate direction of arrival with respect to said receptors, means coupled to said receptors and responsive to said signal received in both of said receptors for extracting said two independent characteristics and means responsive to the value of said extracted characteristics for indicating said two direction coordinates of said received signal.

36. In combination with two receptors so oriented with respect to each other as to cooperatively define uniquely the azimuth and elevation direction of arrival of a received signal, means responsive to said signal received in both of said receptors for measuring two independent characteristics of said signal representative respectively of said azimuth and elevation direction of arrival of said received signal.

37. An energy signal receiving arrangement comprising a pair of receptors, means for effectively spacing said receptors to provide an energy signal reception pattern having an equi-phase signal reception surface, means for effectively diverging said receptors to cause said pattern to have also an equi-amplitude signal reception surface, said spacing and divergence of said receptors dimensioned to cause said surfaces to intersect at right angles, means coupled to said receptors for deriving separate signals corresponding respectively to the sum and difference of energy waves received by said receptors within said patterns, means responsive to an integral multiple of 180 degrees, including zero, out of phase components of said sum and difference signals for deriving a first output signal, means responsive to the quadrature phase components of said sum and difference signals for deriving a second output signal, and means for utilizing said output signals.

38. An electromagnetic wave receiving antenna arrangement comprising a pair of signal receptors, means for effectively spacing said receptors to provide an electromagnetic wave reception pattern having an equi-phase signal reception surface, means for effectively diverging said receptors to cause said pattern to also have an equi-amplitude surface, said spacing and divergence dimensioned to cause said surfaces to intersect at right angles, means connected to said receptors for deriving separate signals corresponding respectively to the sum and difference of electro-magnetic waves received by said receptors within said patterns, means responsive to an integral multiple of 180 degrees, including zero, out of phase components of said sum and difference signals for deriving a first output signal, means responsive to the quadrature phase components of said sum and difference signals for deriving a second output signal, and means for utilizing said output signals.

39. In combination, means for producing a first directive energy beam pattern, means for producing a second directive energy beam pattern, means for spacing said beam patterns to provide an overall energy beam pattern having an equi-phase surface, means for directing said beam patterns from their respective producing means in a manner to provide said overall energy beam pattern with an equi-amplitude surface which is substantially at right angles to said equi-phase surface, means responsive to energy received according to said first and second patterns to provide a pair of signal components having a given phase relationship with respect to each other, means for amplifying said signal components in a common amplifying channel, and means for separating said amplified components in accordance with said given phase relationship.

40. In combination, means for producing a first directive energy beam pattern, means for producing a second directive energy beam pattern, means for spacing and directing said first and second patterns to have given phase and amplitude properties, wherein in one plane the phase properties of said first and second patterns are different and the amplitude properties of said first and second patterns are substantially identical and wherein in a second plane substantially at right angles to said first plane the amplitude properties of said first and second patterns are different and the phase properties of said first and second patterns are substantially identical, and means responsive to energy received according to said first and second patterns for providing first and second signals having a given phase relationship with respect to each other, said first signal representative of the angle of arrival of said energy with respect to said first plane and said second signal representative of the angle of arrival of said energy with respect to said second plane.

References Cited in the file of this patent

UNITED STATES PATENTS

| | | |
|---|---|---|
| 2,417,248 | Godet | Mar. 11, 1947 |
| 2,434,253 | Beck | Jan. 13, 1948 |
| 2,482,162 | Feldman | Sept. 20, 1949 |
| 2,521,732 | Kline | Sept. 12, 1950 |
| 2,526,675 | Litchford | Oct. 24, 1950 |
| 2,530,079 | Riblet | Nov. 14, 1950 |
| 2,533,267 | Lancor | Dec. 12, 1950 |
| 2,536,112 | Varian et al. | Jan. 2, 1951 |
| 2,555,101 | Alvarez et al. | May 29, 1951 |
| 2,567,197 | Fox | Sept. 11, 1951 |
| 2,581,211 | Sink | Jan. 1, 1952 |
| 2,608,683 | Blewett | Aug. 26, 1952 |
| 2,721,320 | Sommers | Oct. 18, 1955 |
| 2,956,275 | Ashby | Oct. 11, 1960 |